May 18, 1926. 1,585,125
D. M. SIMONS
CABLE INSTALLATION
Filed Oct. 15, 1924  3 Sheets-Sheet 1
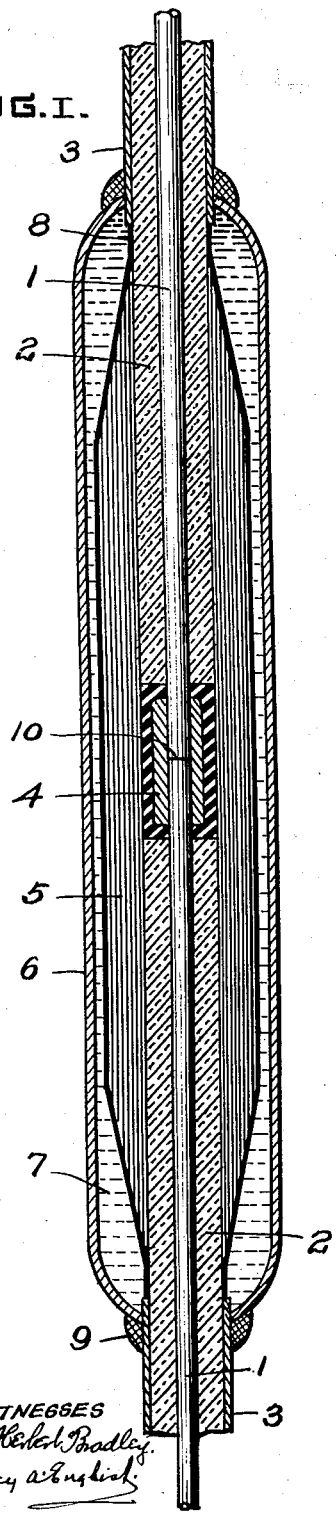
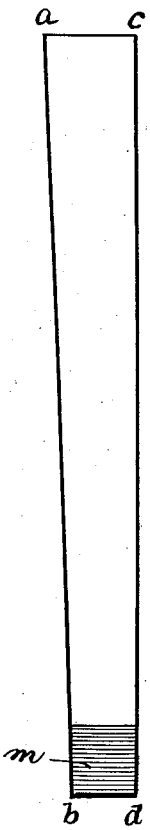
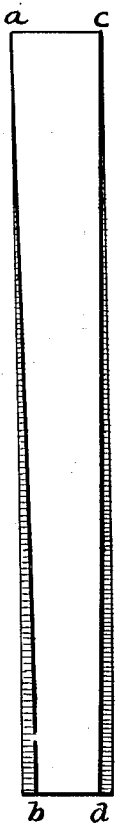
INVENTOR
Donald M. Simons
by Christy and Christy
his attorneys
WITNESSES May 18, 1926.
D. M. SIMONS
CABLE INSTALLATION
Filed Oct. 15, 1924   3 Sheets-Sheet 2
1,585,125
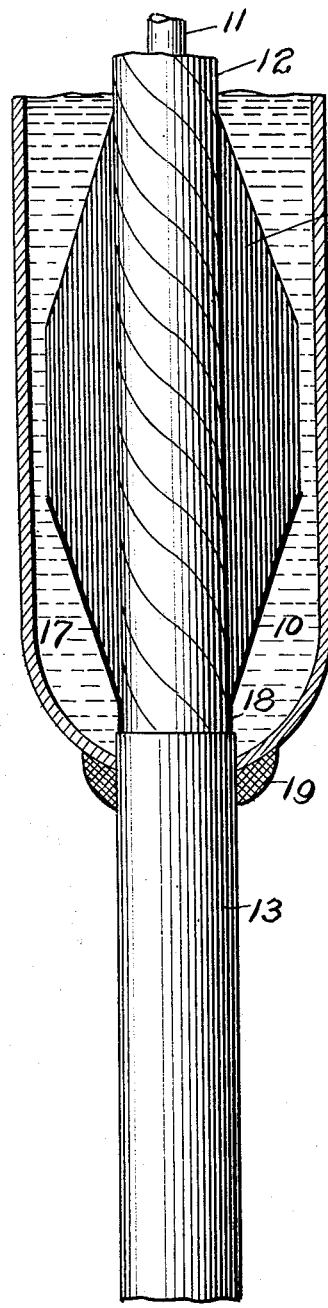
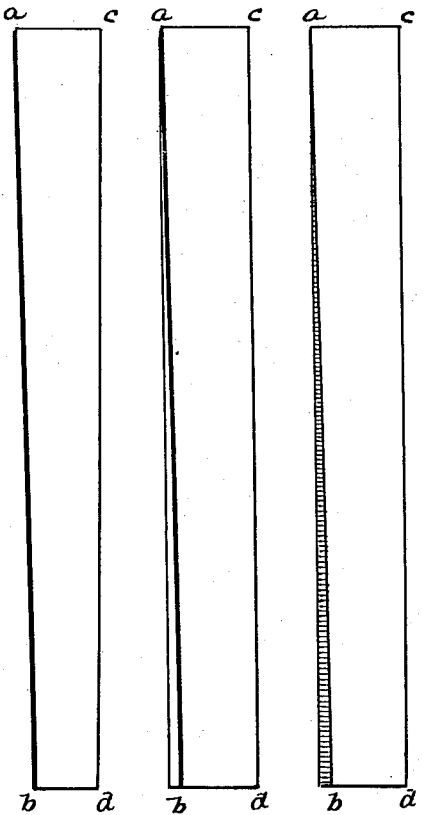
INVENTOR
Donald M. Simons
by Christy and Christy
his attorneys
WITNESSES May 18, 1926.
D. M. SIMONS
1,585,125
CABLE INSTALLATION
Filed Oct. 15, 1924    3 Sheets-Sheet 3
FIG. IX.
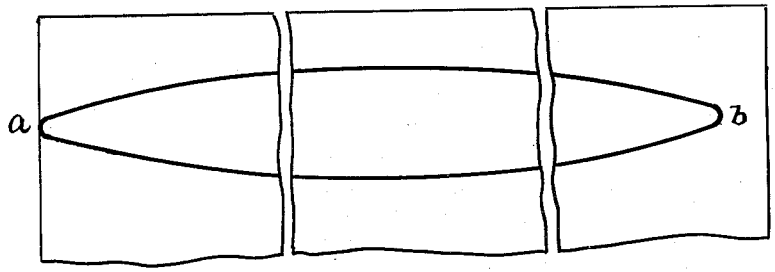
FIG. X.
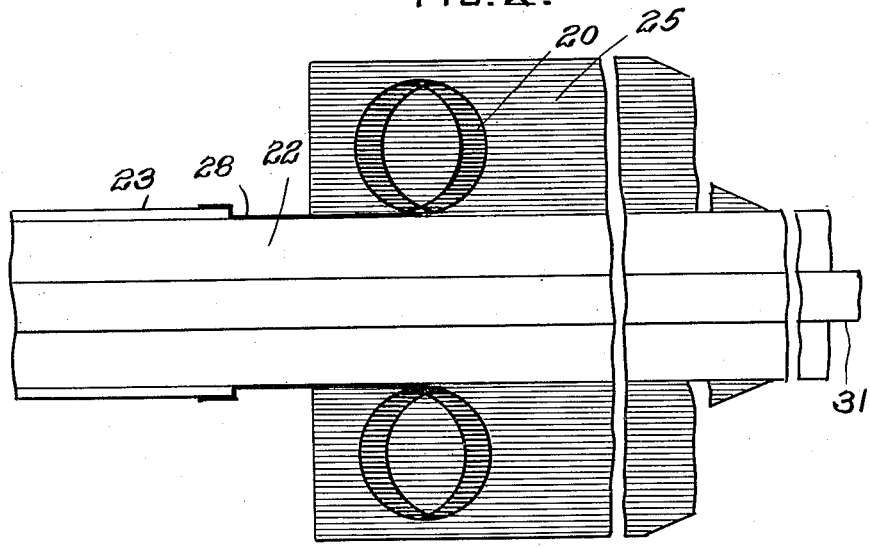
FIG. XI.
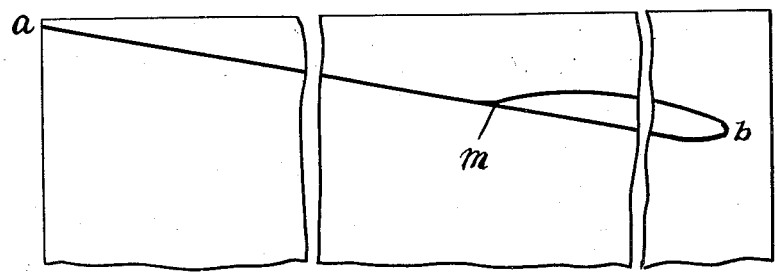
WITNESSES
J. Herbert Bradley
Percy A. English
INVENTOR
Donald M. Simons
by Christy and Christy
his attorneys Patented May 18, 1926.

1,585,125

UNITED STATES PATENT OFFICE.

DONALD M. SIMONS, OF OSBORNE, PENNSYLVANIA, ASSIGNOR TO STANDARD UNDERGROUND CABLE COMPANY, OF PITTSBURGH, PENNSYLVANIA, A CORPORATION OF PENNSYLVANIA.

CABLE INSTALLATION.

Application filed October 15, 1924. Serial No. 743,645.

My invention relates to electrical installations, and is useful, where an annulus of metal surrounding an insulated conductor is liable to concentration of voltage stress. Such a condition exists, typically, in electric cable installations: in joints, in terminals, and wherever for any purpose or under any conditions the cable-sheath is cut away. My invention is found both in superadded structure and in method of building it. In an application for Letters Patent of the United States, Serial No. 750,740, filed November 19, 1924, I have described and claimed my invention generically; in this application and in a companion application, Serial No. 738,424, filed September 18, 1924, I shall describe and claim specific embodiments in which also invention is found.

The art of cable installation has advanced, as the demands of industry have increased, into the field of high-voltage transmission. When voltages were low, it was sufficient, when building a joint, for example, or a terminal, to uncover the conductor at the cable end, and to enclose the otherwise exposed parts in a box or casing, formed ordinarily of metal, which box or casing is secured in weather-tight union, to the end of the cable-sheath. As voltages increased, it was found that the square-cut end of the cable-sheath was a place of concentration of stress, and was, therefore, in the finished installation, a place of weakness. A correction of this difficulty, adequate in some degree, was found in belling out slightly the cut-off end of the lead sheath. With further increase of voltage, which came with the larger and larger demands of industry, this belling of the end of the cable-sheath was found to be insufficient, and then the further expedient was resorted to, of shaping the metallic box or casing with a long, gradual taper, to the orifice through which the cable body had its entrance, and of so uniting the end of the cable-sheath with the wall of the box or casing, as to cause the inner surfaces of the cable-sheath to merge in the taper of the box wall. This, too, was an advance, improving the terminal for heavy work, but still leaving it insufficient to the still increasing demands.

The space within the box or casing and surrounding the union was filled with insulating compound, liquid or viscid in nature. This essentially liquid insulation, overlying the machine-laid insulation of the cable proper, and particularly that portion of the body of liquid insulation which filled the tapered portion of the box wall, was found to be peculiarly liable to break-down. It was discovered that this was due to two circumstances or conditions. One of these is that the specific break-down strength of liquid insulation decreases rapidly with the thickness of the dielectric layer, and, the other is that this liquid dielectric, subject to the tendency just stated, and associated as it is with an envelope of machine-laid insulation which surrounding the conductor underlies it, tends (because of the relative specific inductive capacities of the materials chosen) to take more than its proportionate share of the voltage strain.

The proposal then was made, to fill the tapering space within the box wall and surrounding the body of machine-laid insulation, with a body of solid insulation, excluding from that portion of the structure as completely as possible free liquid insulation. This proposal, however, was attended with great practical difficulties, and when it came to making installation in the field (an inescapable circumstance), highly successful achievement was practically impossible.

The next step in the progress consisted in applying to the cable end within the box, and immediately overlying the otherwise exposed reach of machine-laid insulation, a newly-applied body of wrapped-on insulation, this newly-applied body being at its end tapered, and in coating with metal the tapered end of this body. The metal coating was made electrically continuous with the cut-away end of the cable-sheath. When this body of solid insulation had been applied, the remainder of the space within the box was filled with free liquid insulating compound. Thus the regions within the tapered portion of the box or casing, the regions otherwise peculiarly liable to break-down, were protected.

The difficulties with the structure improved in those details last mentioned are manufacturing difficulties. It will be understood (as has already been intimated) that the structure under consideration has to be built in the field, and it will be apparent that this condition is very unfavorable to the successful performance of work of a very exacting nature. Furthermore, the work at best is of necessity very slowly and laboriously performed.

In the ensuing description of my invention I shall refer to the accompanying drawings, in which, in Fig. I a cable joint embodying my invention is diagrammatically illustrated in medial and longitudinal section. Figs. II, III, and IV illustrate diagrammatically various ways of preparing a sheet of insulating material for use in the practice of my invention. Fig. V is a view similar to Fig. I, illustrating the invention in its application to the building of terminals; Figs. VI, VII, and VIII are views corresponding to Figs. II-IV, and similarly illustrating the sheet in specific form employed in building a terminal. Fig. IX shows a further modification in the particular structure of the sheet of insulating material, and Fig. X illustrates diagrammatically a cable-end prepared by application to it of a sheet of material of the particular structure shown in Fig. IX. Fig. XI illustrates how the modification developed in Figs. IX and X may be applied in an installation of the general character of Figs. I and V.

I shall first describe my invention in its application to the building of a joint, and then I shall explain its wider and more general applicability.

Referring to Fig. I of the drawings, 1 indicates conductors of two cable lengths, united at the point 10. 2 is the machine-laid insulation of the cable lengths, and this machine-laid insulation is, as will be perceived, cut away for a short distance, exposing the conductors at their ends, where their electrical union is effected. 3 is the lead sheath of the cable lengths, and it is cut away, as the drawings show, for greater distances from the exposed ends of the conductor, and appreciable lengths of the machine-laid insulation are exposed.

In making the union between the ends of conductors 1, the entire space between the cut-off ends of the bodies 2 of machine-laid insulation may be filled and occupied with an annulus of conducting material, but ordinarily an annulus 4 of suitable conducting material is sweated upon the two ends of the conductors brought together within it, as at 10, and then insulation, ordinarily in the form of paper tape, is wrapped upon the union, and with this wrapped-on insulation the entire space is filled out between the cut-off ends of the bodies 2 of machine-laid insulation. Thus a continuous cylindrical body extends between the cut-away ends of the lead sheath 3, and it is this region which is to be protected against break-down when the cable in service is carrying high-voltage current.

My invention consists in surrounding this cylindrical body of insulated conductor with a wrapped-on body 5 of sheet insulation, so prepared as to be applicable under field conditions with expedition and accuracy; and, while a metal covering may be applied to the body 5, or to portions of body 5, after the body has been built to place, preferably, and as a matter of further invention, I so preliminarily prepare the sheet of insulation from which the body 5 is formed that, when it has been wrapped on and the body 5 has been built, that body will include a metallic screen which, when brought into electric continuity with the ends of the cable-sheath, will limit dielectric stress (particularly within the tapered end portions) within the outer surface of the body 5. The essentially liquid insulation which in the finished joint fills the space 7 will not, when the cable is in service, be under stress nor subject to break-down, particularly in the tapered end portions of the joint.

The insulating material in sheet form may be specifically such as is preferred,—paper, varnished cloth, and the like,—but preferably I employ paper impregnated with insulating compound. This material is well known to the art. The body 5 built of it is, electrically considered, a body of solid insulation, and is free of those disadvantageous characteristics of liquid insulation which have been mentioned above.

I employ a single sheet of such material, that is to say, a sheet of such width that in its application it forms the body 5 in a single wrap. It may be formed longitudinally in sections, though preferably it is continuous from end to end.

Such a single sheet of paper, adapted for the achievement of my invention is shown in plan in Fig II. The scale will be understood to be less than the scale of Fig. I, and it will be understood further that the showing is diagrammatic, particularly in that the ratio of length to width is in this drawing not worked out to meet practical conditions. The single sheet is of such dimensions that it may be wrapped upon the cylindrical body of machine-laid insulation and over the union of conductors prepared as I have already described, and, when so applied, may itself constitute the body indicated at 5, Fig. I. The sheet is tapered in either straight lines or with any slight curvature desired, and by virtue of its taper affords in the finished article the tapered-ended body 5 of insulation.

The body 5 so built may after it has been built be metallized superficially, throughout its whole extent, if desired, and in any case over its tapered end portions, and the metal surface is made electrically continuous with the ends 3 of the cable-sheath. Preferably, however, the paper sheet from which the body 5 is formed is so preliminarily prepared that, when applied, the ends of the body 5 will present a gradually flaring screen of conducting material. And this screen of conducting material, being brought into electrical continuity with the cable-sheath, will protect against break-down, in the manner indicated. The tapered sheet of insulation of Fig. II, before its application to form the body 5, is metallized at the edges a—b and c—d. This metallizing is preferably done on both sides and across the very edge of the sheet, and the metallized margin is of sufficient width, so that when the sheet has been wrapped on, the metal of the successive turns will overlap, and form in effect a continuous, substantially funnel-shaped metallic screen conforming to the surface of the tapered ends of the body 5 as seen in Fig. I. It is not, however, necessary that this margin of metal be formed on both sides of the sheet, nor is it necessary that when wrapped on there be overlapping and actual contact of metal upon metal in the successive turns, for, even without such overlapping contact, the metal in the assembled article will at least assume the form of a flaring spiral, and this spiral will be effective to accomplish the same results. However, it will of course be understood that, in such case, the applied metal must be heavy enough to serve in this particularly attenuated shape as one of the two opposing plates (the cable conductor being the other plate) of what is, in effect, a condenser. The spiral just mentioned may, if desired, additionally, be brought into continuity with the cable-sheath through tabs of metal foil laid between the turns as the wrapping on of body 5 progresses, and whose free ends are then electrically united with the lead sheath.

Instead of providing a sheet which is tapering, as shown in Fig. II, I may provide a sheet such as those shown in Figs. III and IV, which are not tapering at all, but are of uniform width from end to end, and I may apply to such a sheet, and along the converging lines a—b and c—d of Fig. III, which may be straight or slightly curved, a similar attenuated body of conducting material. The conducting material so applied may be applied to one side only or to both sides, and if applied to both sides, the two applications may be rendered electrically one by causing them to penetrate perforations formed through the sheet along the lines a—b and c—d. The inlay may extend from surface to surface, forming a complete break in the continuity of the paper, although, of course, maintaining the continuity of the sheet.

Again, in Fig. IV, I show a sheet which, like the sheet shown in Fig. III, is not tapered, but is, indeed, of uniform width throughout, and in which, from the lines a—b and c—d, outward to the edge, the sheet is metallized. This metallizing may be upon one face or upon both faces.

The application of the metal to the surface of the body 5, initially applied without metal, as first described, and the application of metal to the sheet material as has now been described with reference to Figs. II, III, and IV, may be variously accomplished. The metal may be applied in the form of paint, or it may be sprayed on, or again it may be applied in the form of foil, and if in the form of foil, it may (with Figs. II–IV in mind) constitute an inlay in a sheet minutely shaped to receive such an inlay, and so the sheet may after the application of metal has been made, be uniform in thickness from edge to edge. That is to say, the sheet may be made multiple-ply, and certain of the plies of which the sheet is composed may be cut, so that in the assembly of plies the inlay of metal foil will form with the cut portions of the plies, continuous layers in the compound sheet. Or, again, the metal strip may extend from surface to surface, and, while still maintaining the continuity of the sheet, may effect a complete interruption in the continuity of the body of insulating material.

The metallic flaring body so formed is at either end united electrically to the lead sheath 3 of the cable in any suitable way, as by means of a foil wrapping 8.

It will thus be seen that in the finished article the conductor is surrounded within the sleeve of the joint by a body of solid insulation which at its ends supports a flaring screen of conducting material which is electrically continuous with the cable-sheath. As particularly illustrated in Fig. I, this screen underlies the reduced ends of the sleeve 6 of the joint. The space 7 then may be filled with insulating compound, and in service this compound will not be under dielectric strain.

Additionally, the strip may at the end be metallized for a proper distance, as indicated at m, Fig. II, so that when applied the body 5 will, throughout its whole extent, be virtually metal-surfaced, and thus at every point from one end of the joint to the other the liquid insulation which fills the space 7 is free of stress.

In the practice of my invention then the body of insulation 5 carries at either end flaring screens of metal which in assembly are made electrically continuous with the cut-away ends of the cable-sheath. The intermediate cylindrical portion of the body 5 may or may not carry superficially a metal screen. I have described one way of providing such a screen upon the intermediate cylindrical portion of the body 5. By way of alternative, while the flaring screens of the end portions of body 5 may be provided by localized metallization of the strip of which the body 5 is essentially formed, the screen for the intermediate and cylindrical portion of body 5 may be applied after the body 5 has otherwise been built, as by wrapping this portion of the body 5 in metal foil. Such screen of the intermediate portion of the body 5 may be brought into immediate continuity with the flaring screens of the end portions of the body 5; and additionally, it may be grounded immediately to the surrounding joint-sleeve 6.

In making application the usual procedure is followed. The sleeve 6 is slipped over the end of one of the two lengths of cable which are to be joined. The ends of the cable lengths having been prepared, the conductors 1 are first united, and as ordinarily will be the case, insulation is wrapped over the union 4 to fill the space between the cut-away ends of the bodies 2 of machine-laid insulation. The strip of material described above, having previously been prepared, then is wrapped to form the body 5. The foil wrapping 8 is then applied, to afford electrical continuity between the ends 3 of the cable-sheath and the metallic screen constituted by the metallized surfaces of the wrapped-on sheet which forms the body 5. When this has been done, the sleeve 6 is brought to position. Its ends are shaped, so far as may be necessary, to bring them adjacent to the surfaces of the ends 3 of the cable-sheath, and the wiped solder joints 9 are then made. The space 7 within the sleeve and between the body 5 of insulation and the sleeve, is then filled with insulating compound. The filling openings are closed, and the joint is ready for service.

It will be understood without particular illustration that the invention which I have described may be applied separately to each of the conductors of a multiple-conductor cable, and the whole included within a common joint casing. It will also be apparent that the invention lends itself to the enjoyment of the invention of Letters Patent No. 1,199,789, granted October 3, 1916, on the application of Martin Hochstadter, and that the metallic screen upon the body 5 of my improved joint may be made electrically continuous with the foil integument provided by Hochstadter upon the insulated conductor and beneath the cable-sheath.

As compared with the building of the joints known to the prior art, my invention may be practiced with the achievement of a joint in no respect inferior, but of highest excellence, electrically considered; and, in addition to that, the operation of joint-building is simplified, and may be performed in the field in adequate manner and with large saving in time and labor.

Turning from Figs. I–IV, to the disclosure of Figs. V–VIII, the application of the invention to terminal building will readily be understood. The cable conductor is indicated at 11; the envelope of machine-laid insulation, at 12; and the lead sheath of the cable at 13. The uncovered reach of machine-laid insulation 12 is surrounded with a wrapped-on body 15, which possesses essentially those features and characteristics which are described above in connection with the body 5 of Fig. I. The specific differences are these: the body 15 carries the flaring screen of conducting material at that end only which is adjacent the cut-away end of the cable sheath, and the medial and essentially cylindrical portion of the body 15 is not superficially metallized. Accordingly, it will be remarked of the strip used for building the terminal, illustrated in various forms (corresponding to the forms of Figs. II–IV, already described), that it is only one edge (the left-hand edge) of the strip which is metallized, and that there is no metallizing of the end of the strip, such as in Fig. II is indicated at $m$. The body 15 at its remote end may be square cornered, a result which, as will be perceived will follow, if the strip be cut initially as shown in Figs. VII and VIII, with the edge $c$—$d$ not oblique but perpendicular to the base line $a$—$c$. This edge $c$—$d$ is not metallized. Otherwise, however, the structure and the method of application of body 15 of Fig. V is identically the same as of the body 5, Fig. I.

When the body 15 has so been applied, the terminal casing 16 is brought to place and secured to the cable-sheath 3 by the wiped solder joint 19. The immediately adjacent portion of the wall of casing 16 is so particularly shaped and proportioned as to take over and enclose the applied body 15. The conductor 11 is made continuous with an aerial in usual manner. It will be understood that the terminal casing fragmentarily shown in Fig. V may in other respects be of familiar form, and that after the body 15 has been formed and applied in the manner described the terminal may in usual manner be completed.

What has been said above, in connection with joint-building, about multiple conductor cables and cables of the Hochstadter patent is equally applicable, in connection with terminal building.

Turning now to Figs. IX–XI, it remains to consider the applicability of the invention, in the protection of the exposed end of a cable conductor from breakdown, regardless of whether there be a surrounding casing of metal or an inundating body of liquid insulation. Here the metallic inlay in the sheet of insulating material is laid in oppositely bowed lines, between the points $a$ and $b$, and then when the sheet is applied in the manner already described, to form the body 25 upon the exposed surface of the envelope of machine-laid insulation 22 of the cable, the inlay will assume the form of a torus 20, encircling the insulated conductor, and within the body 25 of insulation. In this particular instance the point $b$ falls short of the end of the sheet. In consequence, the outermost limit of the torus 20 lies well within the outer surface of the applied body 25.

It will be understood that the lines of inlay $a$—$b$ may be varied in their minute disposition over the sheet, and that in consequence the torus 20 developed from the inlay may be modified at will in its particular shape. In any case, before the body 25 is applied, a layer of conducting material, preferably a wrapping of metal foil, will be laid, overlapping the end 23 of the cable-sheath, and underlying the body 25 and affording a path of electric continuity between the cable-sheath and the body of conductor 20.

Such a metallic body so placed will be effective when the cable is in service, to dissipate dielectric stress, and to eliminate danger of dielectric discharge from the uncovered end 31 of the conductor.

To the flaring screen formed within a joint or within a terminal by the use of a sheet such as those illustrated in Figs. III and VII, a torus at the outer rim may be provided by modifying the inlay, in the manner indicated in Fig. XI. Here the line of inlay laid between the points $a$ and $b$ is at an intermediate point $m$ caused to fork, and the furcations, describing lines of opposite curvature unite again at $b$. The portion $a$—$m$ will develop a flaring screen of the normal conformation first described. And at the outer edge of the screen thus far developed, the double inlay $m$—$b$ now particularly described will, in the further application of the sheet, develop peripherally a torus of the general form sufficiently illustrated in Fig. X.

It will be understood, in considering Figs. IX and XI particularly, that the showing is diagrammatic, and that, for purposes of illustration the width of the sheet is greatly exaggerated, relatively to the length, and the curvature of the oppositely bowed lines of metal is so made apparent. In point of fact, the extreme interval of separation of these two lines may be no more than an inch or two in as many hundred feet.

The entire space enclosed by the double lines exemplified in Figs. IX and XI may be metallized, in which case the resulting metallic body carried by the body of insulation will be not a torus but an annulus. That is to say, instead of such a hollow structure as that shown in Fig. X, the metallic body will be of uniform character throughout the cross-section. The benefits and advantages of the structure so modified will be manifest to the engineer. It will be observed of the barrier developed as described in connection with Figs. IX to XI, that there is no sharp edge, and that the barrier is at once a flaring barrier and is a round-edged barrier. In using in this connection the phrase "surface of revolution", it is a structure circular in cross section, which is specifically under consideration. It will be understood that the surface is one which on every cross section and at all points is equidistant from the original surface of the surrounded body. This will be characteristic of the metallic body in question in any given embodiment of the invention, and the phrase "surface of revolution" will be understood to define a surface having this characteristic.

It remains to say that the simple conical screen of Fig. I is not in its applicability limited to a structure including an enclosing casing filled with compound of liquid character, nor is the screen of torus form, particularly shown in Fig. X, limited in applicability to a structure which lacks such a surrounding casing, but either form, and indeed any form contemplated in this application, may be applied in either particular association.

Manifestly, the particular shape of the metallic body 10, 20, developed in the body 5, 15, 25, of insulation may be varied infinitely. In every case, however, it will be perceived that this metallic body will be disposed in a surface of revolution. This surface may be the simple flaring conical surface of Figs. I and V; it may be the torus surface of Fig. X; it may be a combination of the two, as just described in connection with Fig. XI; and, manifestly, as the particular arrangement of the metallic strip or strips is varied, the resultant body within and borne by the body of insulation, will be varied.

I claim as my invention:

1. In a cable installation a cable-end having sheath and insulation cut away at successively greater intervals from the end of the conductor, a body of solid insulation surrounding the otherwise exposed end of the insulating envelope of the cable, such body being formed of sheet material wrapped to place, and such sheet material bearing a strip of metal which, when the sheet is wrapped to place, constitutes a conducting body borne by the body of insulation, which conducting body possesses an outer surface disposed in a surface of revolution with respect to the cable axis, the said conducting body within the body of insulation being in electric continuity with the cable sheath.

2. In a cable installation a cable end with sheath and insulating envelope cut away to successively greater distances from the end of the conductor, a sheet of insulation bearing an attenuate length of metal, wrapped upon the otherwise exposed end of the insulating envelope of the cable, the said length of metal constituting in the completed article a flaring screen borne by the applied wrapping of insulation and in electric continuity with the cut-away end of the cable-sheath, a casing enclosing the whole, and insulation of liquid character filling the space within the casing.

3. In a cable installation, a cable-end having sheath and insulation cut away at successively greater intervals from the end of the conductor, a body of solid insulation surrounding the otherwise exposed end of the insulating envelope of the cable, such body being formed of sheet material wrapped to place, and such sheet material bearing a strip of metal which, when the sheet is wrapped to place, constitutes a flaring-round-edged screen in electrical continuity with the cut-away end of the cable-sheath.

In testimony whereof I have hereunto set my hand.

DONALD M. SIMONS.